(12) United States Patent
Kim

(10) Patent No.: US 11,548,338 B2
(45) Date of Patent: Jan. 10, 2023

(54) SUSPENSION APPARATUS FOR VEHICLE

(71) Applicant: HYUNDAI MOBIS CO., LTD., Seoul (KR)

(72) Inventor: Dong Won Kim, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/313,315

(22) Filed: May 6, 2021

(65) Prior Publication Data

US 2021/0347220 A1  Nov. 11, 2021

(30) Foreign Application Priority Data

May 7, 2020 (KR) .......................... 10-2020-0054305

(51) Int. Cl.
  *B60G 7/00*  (2006.01)
(52) U.S. Cl.
  CPC .......... *B60G 7/001* (2013.01); *B60G 2206/14* (2013.01)
(58) Field of Classification Search
  CPC ...... B60G 7/008; B60G 7/04; B60G 2206/14; B60G 2206/90; B60G 2204/1244; B60G 11/16; B60G 7/001
  See application file for complete search history.

(56) References Cited

U.S. PATENT DOCUMENTS

| 2011/0042914 A1* | 2/2011 | Hirve | B60G 15/068 |
| | | | 280/124.108 |
| 2016/0121674 A1* | 5/2016 | Cha | B60G 11/16 |
| | | | 280/124.151 |
| 2017/0120708 A1* | 5/2017 | Mainz | B60G 11/52 |

FOREIGN PATENT DOCUMENTS

| CN | 113525002 A | * | 10/2021 | |
| DE | 102005011408 A1 | * | 9/2006 | ............. B60G 11/16 |
| JP | 2008024158 A | * | 2/2008 | |
| KR | 100527711 B1 | * | 11/2005 | |
| KR | 20110071564 A | * | 6/2011 | |
| KR | 20170078059 A | * | 7/2017 | |
| KR | 10-2018-0067356 A | | 6/2018 | |
| KR | 20180079829 A | * | 7/2018 | |
| KR | 101887390 B1 | * | 8/2018 | |

OTHER PUBLICATIONS

Katayama M, "Machine Translation of JP 2008024158 A Obtained May 23, 2022", Feb. 7, 2008, Entire Document (Year: 2008).*

* cited by examiner

*Primary Examiner* — James A English
*Assistant Examiner* — Scott F. Underwood
(74) *Attorney, Agent, or Firm* — Morgan, Lewis & Bockius LLP

(57) ABSTRACT

A suspension apparatus for a vehicle may include: a lower arm having a fastening hole formed therein; and a lower pad mounted on the lower arm, wherein the lower pad comprises: a pad body disposed on the lower arm, and configured to buffer shock; and an insertion protrusion protruding from the pad body, and inserted into the fastening hole, wherein the fastening hole and the insertion protrusion each have an angular shape.

9 Claims, 7 Drawing Sheets

SUSPENSION APPARATUS FOR VEHICLE

CROSS-REFERENCE TO RELATED APPLICATION

This application claims the benefit under 35 U.S.C. § 119(a) of Korean Patent Application No. 10-2020-0054305 filed on May 7, 2020 in the Korean Intellectual Property Office, the entire disclosure of which is incorporated herein by reference for all purposes.

BACKGROUND

Field

Exemplary embodiments of the present disclosure relate to a suspension apparatus for a vehicle, and more particularly, to a suspension apparatus for a vehicle, which can improve the assembly performance of a lower arm and a lower pad.

Discussion of the Background

In general, a suspension apparatus for a vehicle refers to an apparatus which connects an axle and a vehicle body such that road vibration or shock transferred from a wheel of a vehicle during driving is not directly transferred to the vehicle body, thereby preventing damage to the vehicle body and providing a comfortable ride.

Such a suspension apparatus includes a lower arm which functions to support a wheel while connecting the wheel to a vehicle body. In the case of a multi-link rear wheel suspension apparatus, a lower pad formed of rubber is applied in order to prevent direction contact between a spring and the lower arm, and to secure the seating stability of the spring while absorbing vibration.

A rear-wheel lower pad blocks noise and vibration over and under the spring in the rear wheel suspension apparatus. A rear-wheel lower arm is connected to a cross member, and serves to support the vehicle body through the spring. The rear-wheel lower pad has a plurality of fixing protrusions formed thereon so as to be mounted on the rear-wheel lower arm, and the fixing protrusions serve to set the position of the lower pad, while preventing the movement of the lower pad.

In the suspension apparatus according to the related art, the rear-wheel lower arm and the rear-wheel lower pad are assembled through a process of seating the lower pad in an assembly hole of the lower arm and pulling first and second protrusions of the lower pad from the assembly hole. Thus, the assembly operation time and the number of processes are increased.

Furthermore, since the lower arm and the lower pad are assembled only through two parts, i.e. the first and second protrusions, the lower pad may be separated after the assembly process. Therefore, there is a need for an apparatus capable of solving the problem.

The related art of the present disclosure is disclosed in Korean Patent Application Laid-Open No. 10-2018-0067356 published on Jun. 20, 2018 and entitled "Suspension Apparatus for Vehicle".

SUMMARY

Various embodiments are directed to a suspension apparatus for a vehicle, which can facilitate an operation of assembling a lower arm and a lower pad.

In an embodiment, a suspension apparatus for a vehicle may include: a lower arm having a fastening hole formed therein; and a lower pad mounted on the lower arm. The lower pad may include: a pad body disposed on the lower arm, and configured to buffer shock; and an insertion protrusion protruding from the pad body, and inserted into the fastening hole. The fastening hole and the insertion protrusion may each have an angular shape.

The inner surface of the fastening hole and the outer surface of the insertion protrusion may have the same angular shape as each other.

The lower arm may have one or more fastening holes, and the lower pad may have one or more insertion protrusions.

The lower arm may include: a lower arm body having the fastening hole formed therein; and a lower arm burring extending from the lower arm body toward the pad body, and inserted into the lower pad.

The lower pad may further include a housing part into which the lower arm burring is inserted. The housing part may surround inner and outer surfaces of the lower arm burring.

The housing part may surround entire circumferences of the inner and outer surfaces of the lower arm burring.

The lower pad may further include a reinforcement part connected to an inner surface of the housing part, and extending from the pad body in a direction away from the housing part.

The reinforcement part may extend from the inner surface of the housing part by the same length.

The reinforcement part may extend substantially perpendicularly to the inner surface of the housing part.

The reinforcement part may extend substantially perpendicularly to the inner and outer surfaces of the lower arm burring.

In the suspension apparatus for a vehicle in accordance with the embodiment of the present disclosure, the assembly process is conveniently performed while the angular insertion protrusion of the lower pad is inserted into the angular fastening hole of the lower arm, which makes it possible to reduce the number of processes and to improve the productivity.

Furthermore, the lower arm burring of the lower arm may be inserted into the housing part of the lower pad, which makes it possible to maintain the state in which the lower pad is reliably assembled to the lower arm.

DETAILED DESCRIPTION OF THE ILLUSTRATED EMBODIMENTS

Hereinafter, a suspension apparatus for a vehicle will be described below with reference to the accompanying drawings through various exemplary embodiments. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
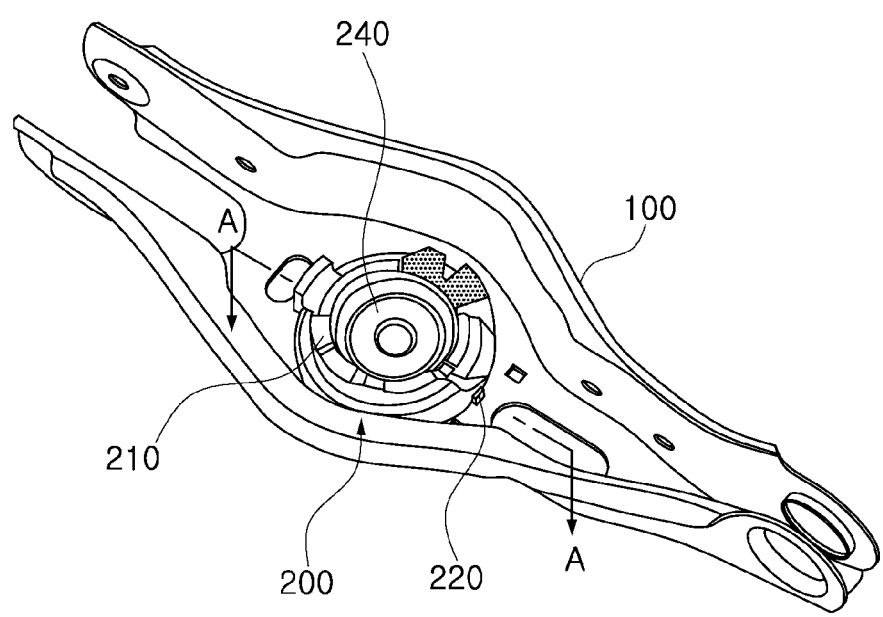
FIG. 1 is a perspective view schematically illustrating a suspension apparatus for a vehicle in accordance with an embodiment of the present disclosure.
Figure 2:
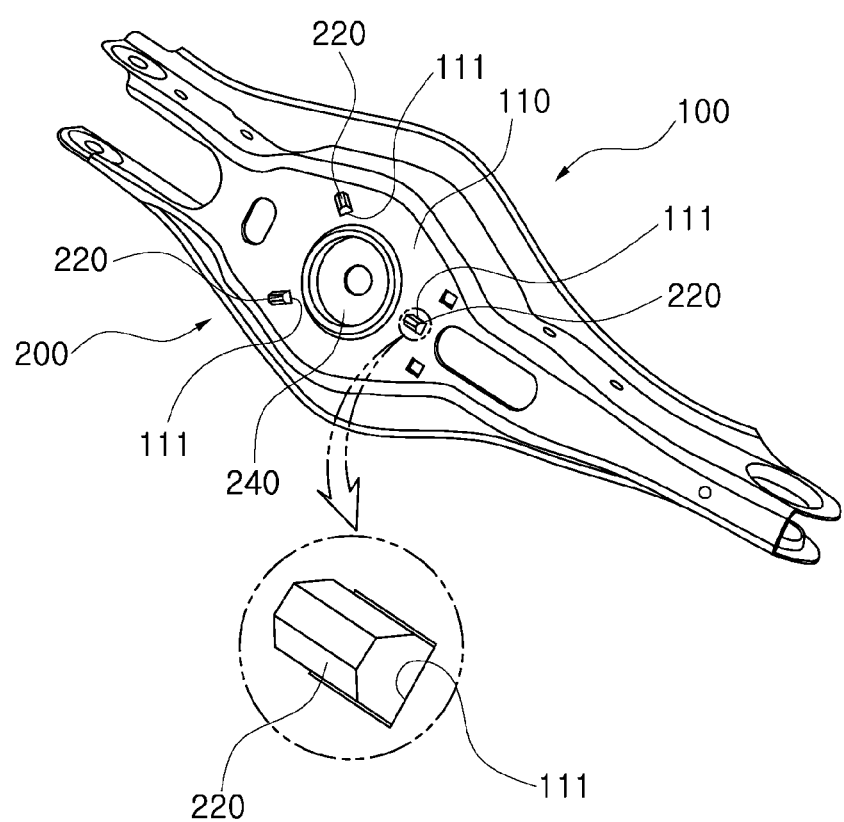
FIG. 2 is a bottom perspective view schematically illustrating the suspension apparatus for a vehicle in accordance with the embodiment of the present disclosure.
Figure 3:
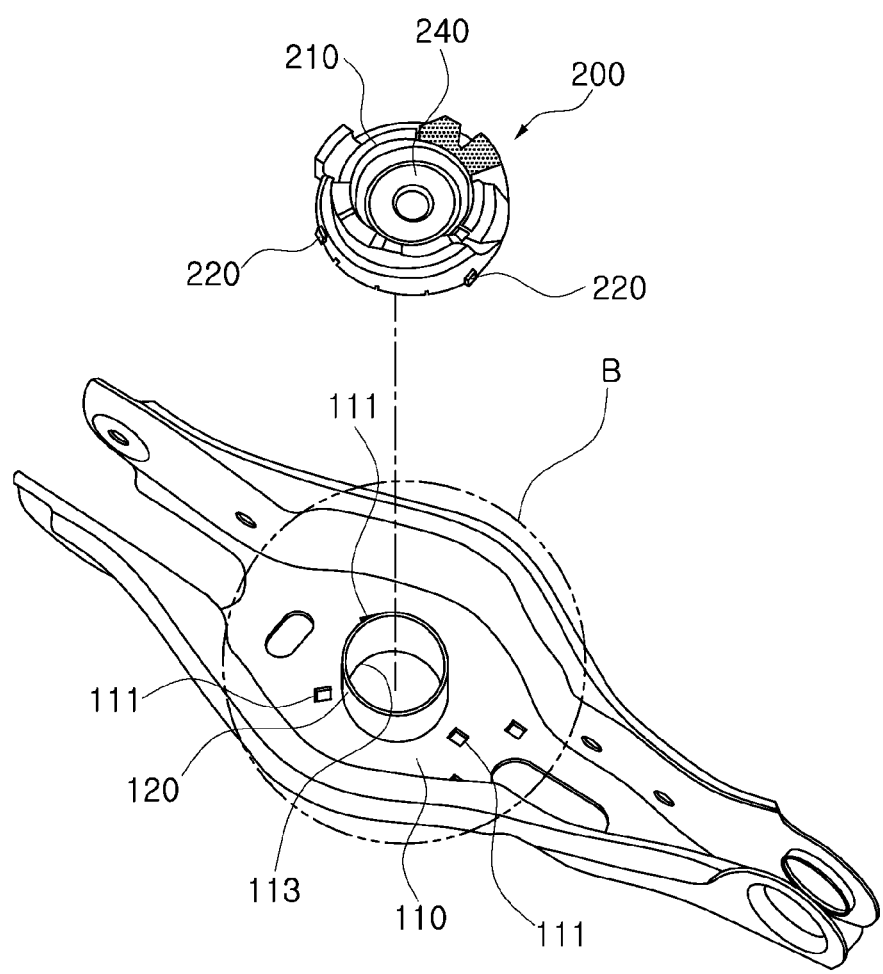
FIG. 3 is an assembled perspective view schematically illustrating the suspension apparatus for a vehicle in accordance with the embodiment of the present disclosure.
Figure 4:
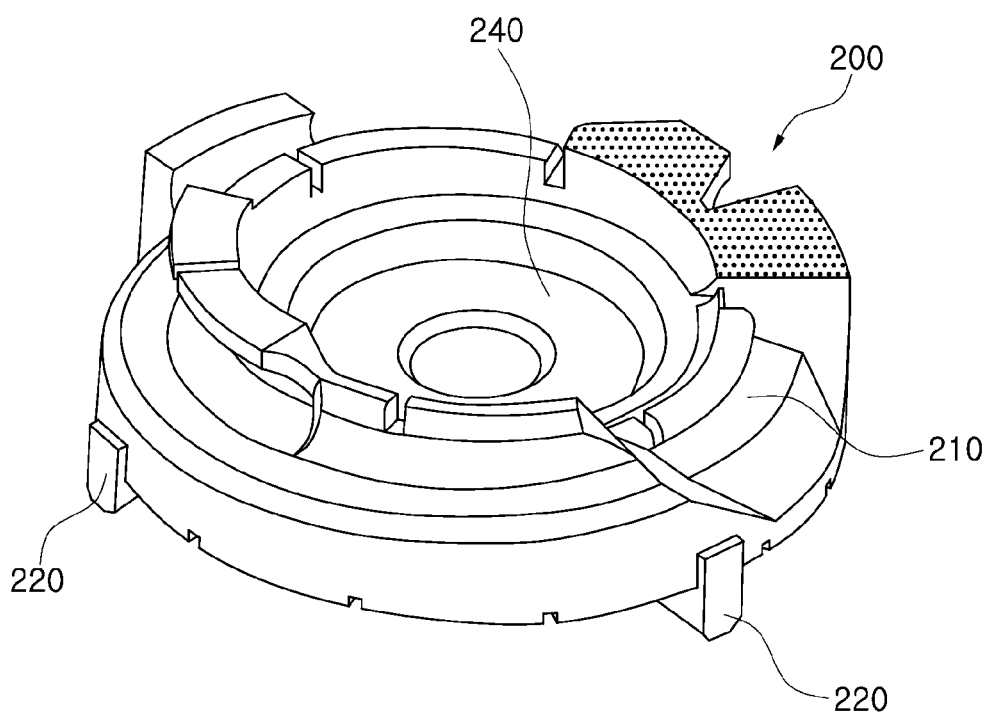
FIG. 4 is a perspective view schematically illustrating a lower pad in accordance with the embodiment of the present disclosure.
Figure 5:
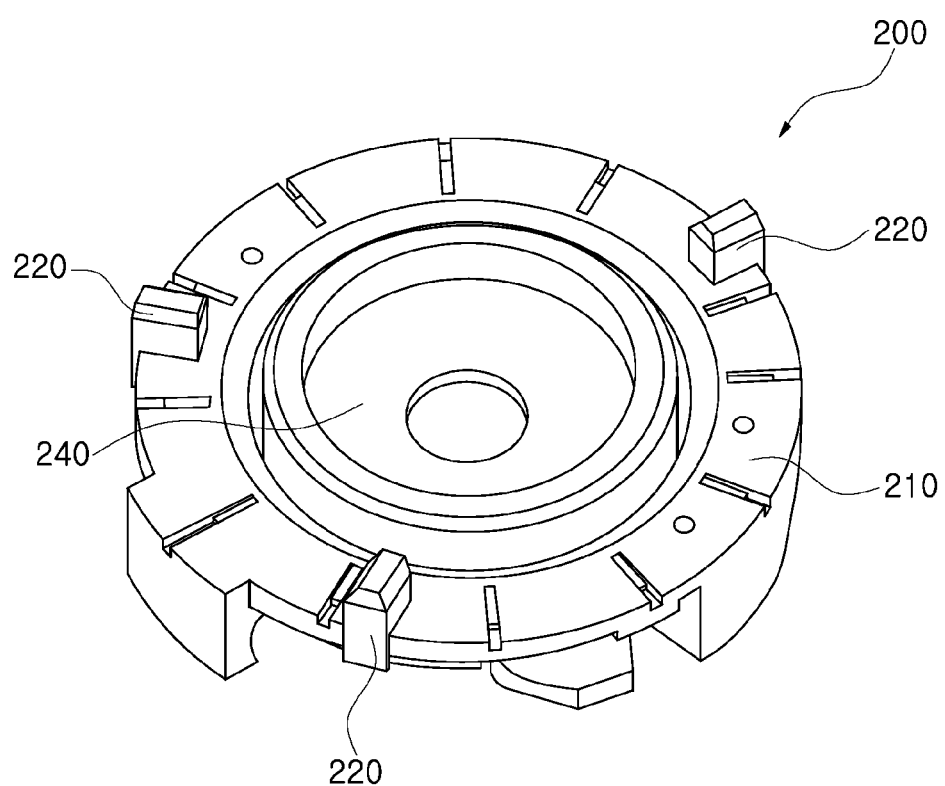
FIG. 5 is a bottom perspective view schematically illustrating the lower pad in accordance with the embodiment of the present disclosure.
Figure 6:
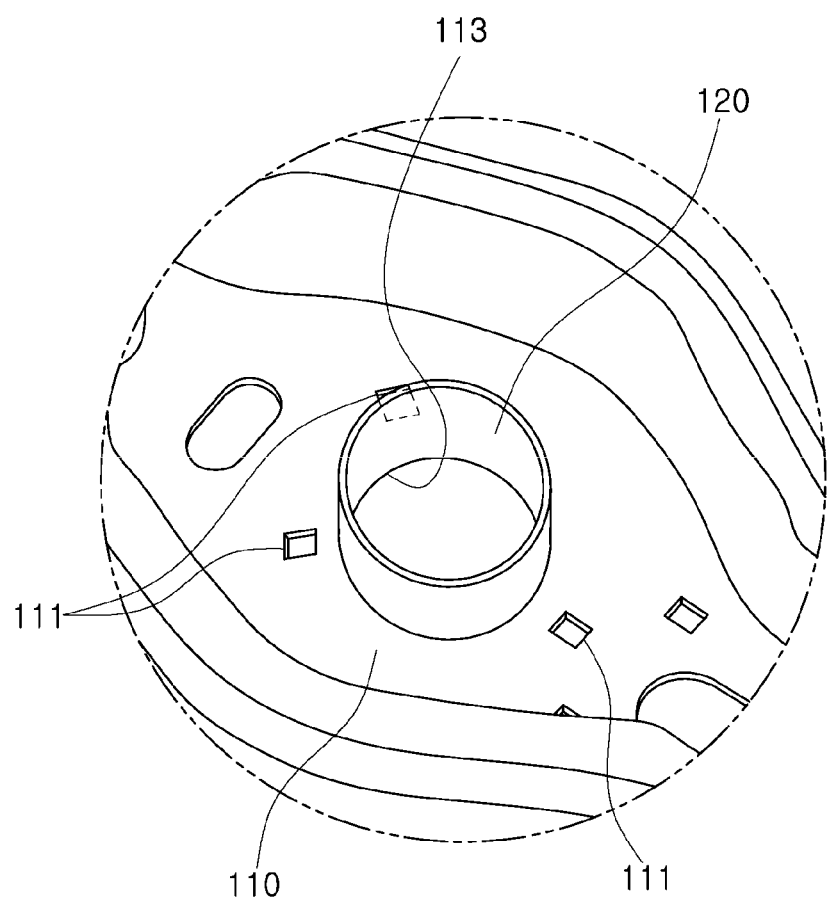
FIG. 6 is a partially expanded view schematically illustrating a portion B of FIG. 3.
Figure 7:
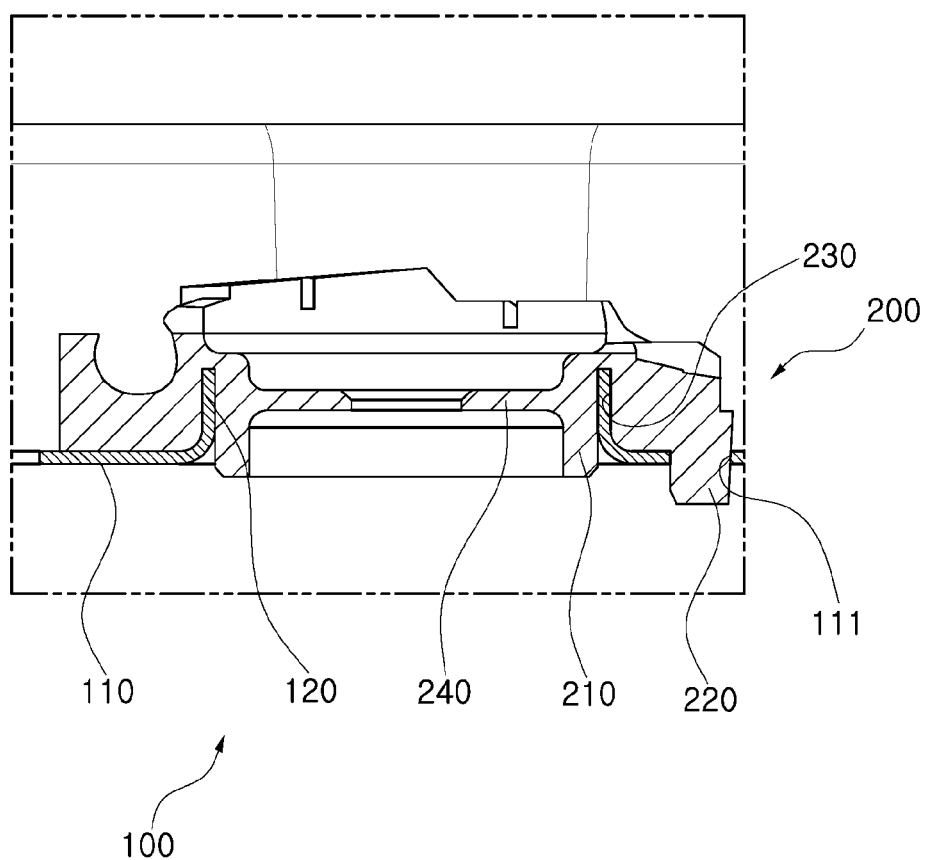
FIG. 7 is a schematic cross-sectional view taken along line A-A of FIG. 1.

FIG. 1 is a perspective view schematically illustrating a suspension apparatus for a vehicle in accordance with an embodiment of the present disclosure, FIG. 2 is a bottom perspective view schematically illustrating the suspension apparatus for a vehicle in accordance with the embodiment of the present disclosure, FIG. 3 is an assembled perspective view schematically illustrating the suspension apparatus for a vehicle in accordance with the embodiment of the present disclosure, FIG. 4 is a perspective view schematically illustrating a lower pad in accordance with the embodiment of the present disclosure, FIG. 5 is a bottom perspective view schematically illustrating the lower pad in accordance with the embodiment of the present disclosure, FIG. 6 is a partially expanded view schematically illustrating a portion B of FIG. 3, and FIG. 7 is a schematic cross-sectional view taken along line A-A of FIG. 1.

Referring to FIGS. 1 to 7, the suspension apparatus for a vehicle in accordance with the embodiment of the present disclosure includes a lower arm 100 and a lower pad 200.

The lower arm 100 serves to absorb road shock, road vibration and a change in height or angle by a steering apparatus operation when a vehicle travels. The lower arm 100 has a fastening hole 111 and a through-hole 113, which are formed therethrough. The lower pad 200 has an insertion protrusion 220 inserted and fastened to the fastening hole 111. In the present disclosure, the fastening hole 111 may be formed in not only a through-hole shape, but also a groove shape. The through-hole 113 is formed through the center of the lower arm 100, and a lower arm burring 120 is erected from the through-hole 113 so as to protrude toward the lower pad 200.

The lower pad 200 is mounted on the lower arm 100. The lower pad 200 has a spring (not illustrated) installed at the top thereof, and serves to prevent road vibration or shock, transferred from a wheel of the vehicle, from being transferred to the vehicle body, thereby preventing damage to the vehicle body and stably providing a comfortable ride. The lower pad 200 includes a pad body 210 and the insertion protrusion 220.

The pad body 210 abuts on the lower arm 100, and serves to buffer shock. The pad body 210 is formed in a cylindrical shape, and has a through-hole formed in the center thereof and corresponding to the through-hole 113.

The insertion protrusion 220 protrudes from one surface (bottom surface based on FIG. 3) of the pad body 210, and is inserted into the fastening hole 111. The insertion protrusion 220 is inserted into the fastening hole 111 so as to maintain the state in which the lower pad 200 is reliably coupled to the lower arm 100. The insertion protrusion 220 has a tapered end (see FIG. 2) whose width decreases in an insertion direction to the fastening hole 111, and thus is easily inserted into the fastening hole 111.

In the present disclosure, the fastening hole 111 of the lower arm 100 and the insertion protrusion 220 of the lower pad 200 are formed in an angular shape. The fastening hole 111 and the insertion protrusion 220 are formed in the same angular shape. In the present disclosure, the drawings illustrate that the fastening hole 111 and the insertion protrusion 220 are formed in a rectangular shape. However, the present disclosure is not limited thereto, but the fastening hole 111 and the insertion protrusion 220 may be formed in an angular shape such as a triangle, pentagon or hexagon.

The fastening hole 111 and the insertion protrusion 220 are formed in the same angular shape. Thus, although one insertion protrusion 220 and the fastening hole 111 are coupled to each other, it is possible to set the position of the lower pad 200, and to prevent movement of the lower pad 200.

In the present disclosure, one or more fastening holes 111 and one or more insertion protrusions 220 are formed. The fastening holes 111 may be paired and the insertion protrusions 220 may be paired. The pair of fastening holes 111 may be formed in the lower arm 100 and the lower pad 200, respectively, and the pair of insertion protrusions 220 may be formed in the lower arm 100 and the lower pad 200, respectively, in order to maintain a stable coupling state.

In another embodiment, a plurality of fastening holes 111 and a plurality of insertion protrusions 220 may be formed and fastened to maintain a more stable coupling state. At this time, the pair of fastening holes 111 and the pair of insertion protrusions 220 may be symmetrically disposed in the lower arm 100 and the lower pad 200.

The lower arm 100 includes a lower arm body 110 and the lower arm burring 120. The pad body 210 of the lower pad 200 is mounted on the lower arm body 110, and the fastening hole 111 is formed at one surface (right side in FIG. 3) of the lower arm body 110. The fastening hole 111 of the lower arm body 110, into which the insertion protrusion 220 of the lower pad 200 is inserted, is disposed to face the insertion protrusion 220. The fastening hole 111 is formed in the same angular shape as the insertion protrusion 220.

The lower arm burring 120 is formed in such a shape that is rolled and erected from the through-hole 113 formed though the center of the lower arm body 110 toward the lower pad 200 (top side in FIG. 3). That is, the lower arm burring 120 is extended from the lower arm body 110 toward the pad body 210. The lower arm burring 120 may be inserted into the lower pad 200 such that the lower arm 100 and the lower pad 200 are more reliably fastened to each other, which makes it possible to prevent the movement of the lower pad 200.

In the present disclosure, the lower pad 200 further includes a housing part 230 into which the lower arm burring 120 is inserted. The housing part 230 is concavely formed in the pad body 210 so as to face the lower arm burring 120. The housing part 230 corresponds to the shape of the lower arm burring 120, and is formed in a ring shape in the pad body 210. The lower arm burring 120 is inserted into the housing part 230 of the lower pad 200 such that the lower arm 100 and the lower pad 200 are easily coupled to each other and thus more reliably fastened to each other, thereby preventing the movement of the lower pad 200.

In the present disclosure, the lower pad 200 further includes a reinforcement part 240. The reinforcement part 240 is extended from the pad body 210 in a direction away from the housing part 230, for example, an inward direction in FIG. 7. The reinforcement part 240 is formed in the pad body 210, and provides rigidity to the lower pad 200 having the housing part 230 formed therein, thereby preventing deformation in the shape of the lower pad 200.

The reinforcement part 240 is formed perpendicular to the housing part 230. That is, as illustrated in FIG. 7, the housing part 230 is formed perpendicular to the pad body 210, and the reinforcement part 240 is formed in parallel to the pad body 210. Therefore, the reinforcement part 240 is formed perpendicular to the housing part 230, and reinforces the lower pad 200 with the lower arm burring 120 inserted into the housing part 230, thereby preventing the lower pad 200 from being deformed in vertical and horizontal directions.

Hereafter, an assembly process of the suspension apparatus having the above-described structure in accordance with the embodiment of the present disclosure will be described. The lower arm 100 is disposed at the bottom, and the lower pad 200 is disposed at the top of the lower arm 100. The insertion protrusion 220 of the lower pad 200 is disposed to face the fastening hole 111 of the lower arm 100.

The housing part 230 of the lower pad 200 is inserted into the lower arm burring 120 of the lower arm 100, and the insertion protrusion 220 is inserted into the fastening hole 111. The lower pad 200 is pressed down toward the lower arm 100 so as to be assembled to the lower arm 100.

The insertion protrusion 220 and the fastening hole 111 may be formed in the same angular shape to prevent the lower pad 200 from rotating and moving in the lower arm 100. Furthermore, since the lower pad 200 and the lower arm 100 are assembled through one insertion protrusion 220 and one fastening hole 111 which are formed in an angular shape, the time required for assembling a product may be shortened.

In the suspension apparatus for a vehicle in accordance with the embodiment of the present disclosure, the assembly process is conveniently performed while the angular insertion protrusion 220 of the lower pad 200 is inserted into the angular fastening hole 111 of the lower arm 100, which makes it possible to reduce the number of processes and to improve the productivity.

Furthermore, the lower arm burring 120 of the lower arm 100 may be inserted into the housing part 230 of the lower pad 200, which makes it possible to maintain the state in which the lower pad 200 is reliably assembled to the lower arm 100.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A suspension apparatus for a vehicle, comprising:
a lower arm having a fastening hole formed therein; and
a lower pad mounted on the lower arm,
wherein the lower pad comprises:
a pad body disposed on the lower arm, and configured to buffer shock; and
an insertion protrusion protruding from the pad body, and inserted into the fastening hole,
wherein the fastening hole and the insertion protrusion each have an angular shape, and
wherein the lower arm comprises:
a lower arm body having the fastening hole formed therein; and
a lower arm burring extending from the lower arm body toward the pad body, and inserted into the lower pad.

2. The suspension apparatus of claim 1, wherein an inner surface of the fastening hole and an outer surface of the insertion protrusion have the same angular shape as each other.

3. The suspension apparatus of claim 2, wherein the lower arm has one or more fastening holes, and the lower pad has one or more insertion protrusions.

4. The suspension apparatus of claim 1, wherein the lower pad further comprises a housing part into which the lower arm burring is inserted,
wherein the housing part surrounds inner and outer surfaces of the lower arm burring.

5. The suspension apparatus of claim 4, wherein the housing part surrounds entire circumferences of the inner and outer surfaces of the lower arm burring.

6. The suspension apparatus of claim 4, wherein the lower pad further comprises a reinforcement part connected to an inner surface of the housing part, and extending from the pad body in a direction away from the housing part.

7. The suspension apparatus of claim 6, wherein the reinforcement part extends from the inner surface of the housing part by the same length.

8. The suspension apparatus of claim 5, wherein the reinforcement part extends substantially perpendicularly to the inner surface of the housing part.

9. The suspension apparatus of claim 5, wherein the reinforcement part extends substantially perpendicularly to the inner and outer surfaces of the lower arm burring.

\* \* \* \* \*